United States Patent [19]

Yoda et al.

[11] Patent Number: 5,502,580
[45] Date of Patent: Mar. 26, 1996

[54] COLOR REPRODUCTION SYSTEM

[75] Inventors: Akira Yoda; Yoshinori Usami; Shuichi Ohtsuka, all of Kanagawa, Japan

[73] Assignee: Fuji Photo Flim Co., Ltd., Kanagawa, Japan

[21] Appl. No.: 315,625

[22] Filed: Sep. 30, 1994

[30] Foreign Application Priority Data

Oct. 6, 1993 [JP] Japan .................................. 5-250528

[51] Int. Cl.⁶ ........................... H04N 1/52; H04N 1/56; H04N 1/60; H04N 1/393
[52] U.S. Cl. ...................... 358/518; 358/519; 358/528; 358/536; 358/523
[58] Field of Search .................................... 358/518, 519, 358/520, 521, 523, 528, 536, 530; 382/167

[56] References Cited

U.S. PATENT DOCUMENTS 4,500,919 2/1985 Schreiber .................. 358/518

FOREIGN PATENT DOCUMENTS

92/17982 10/1992 WIPO .............................. H04N 1/46

Primary Examiner—Scott A. Rogers
Attorney, Agent, or Firm—Sughrue, Mion, Zinn, Macpeak & Seas

[57] ABSTRACT

A color space data conversion formula corresponding to the input and output conditions can be selected from basic profiles which consists of a plurality of the conversion formulas for color reproduction processes. A plurality of parameters or a plurality of variable conversion formulas can be selected from subprofiles, in accordance with the input and output conditions and on the ground of the color space data conversion formula selected from the basic profiles. Basic profiles or subprofiles can be added or modified. The color image data are processed highly accurately to obtain color images of high reproducibility, for thereby facilitating the setting of the input and output conditions.

14 Claims, 7 Drawing Sheets

FIG.4

- PRINTING OUTPUT CONDITION PROFILES
  - SUPPORT LAYER PROFILE
    - PAPER A | PAPER B | OTHER
  - SCREEN PULING/DOT SHAPE PROFILE
    - RULING A | RULING B | OTHER
  - INK PROFILE
    - INK SET A | INK SET B | OTHER
  - BLACK PRINTER QUANTITY PROFILE
    - BLACK PRINTER QUANTITY A | BLACK PRINTER QUANTITY B | OTHER
  - LOOK-UP TABLE
  - STANDARD PROFILE
  - OTHER PROFILE

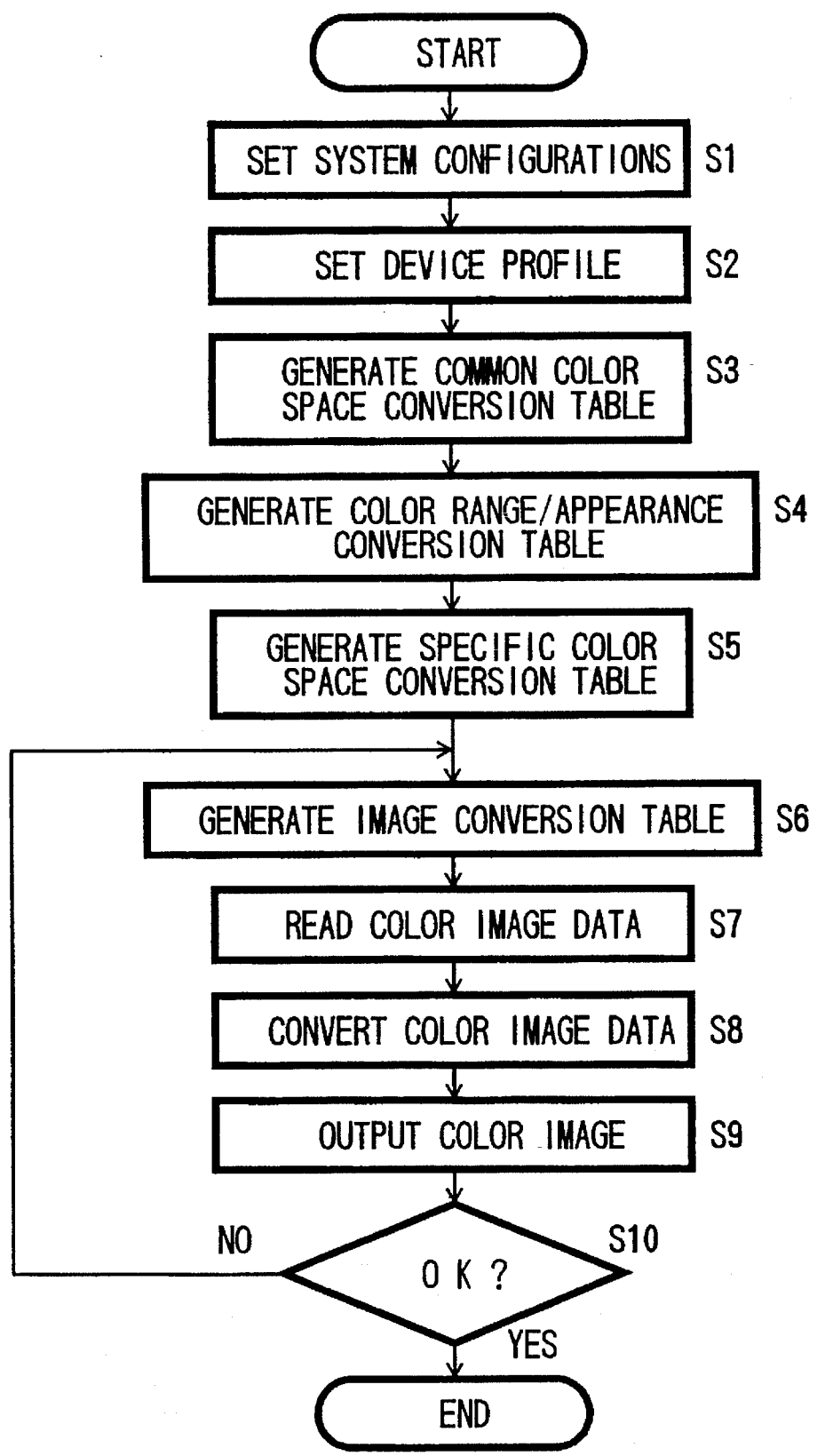

COLOR REPRODUCTION SYSTEM

BACKGROUND OF THE INVENTION

1. Field of the Invention

The present invention relates to a color reproduction system which has color space data conversion formulas, their related formulas, parameters, etc. which are established in a hierarchical structure, and which allows a desired color space data conversion formula, etc. to be selected under various given input and output conditions for facilitating the reproduction of highly accurate colors.

2. Description of the Related Art

In recent years, there have widely been used color reproduction systems for reading a color image from an original document such as a photograph, a paint, or the like or processing color image data supplied from an image input device and either displaying a color image on a cathode-ray tube (CRT), outputting a color image as a hard copy from a printer, or printing a color image with a press plate. It is desirable to be able to obtain a color image of desired color tones irrespective of different output mediums and processing steps.

A printed material is produced according to a number of processing steps. More specifically, color separation films of Y, M, C, K are generated on the basis of color image data supplied from an image input device, and presensitized plates are exposed to color images through the color separation films. Then, the color images on the presensitized plates are developed, and the presensitized plates are set on a printing press to produce a printed material. The colors on the printed material which are finally produced depend on various printing conditions including the paper, inks, and water used, the type of the printing press, and the screen ruling and dot shape which are employed for the formation of dot-matrix images. In the field of printing industry which requires the above complex processing steps and conditions, there has been a demand for a system or process which displays color image data processed as desired on a CRT or the like for the user to confirm the final image quality of a printing material on the CRT or the like with high accuracy.

One prior art system which meets the above demand is a color reproduction system disclosed in U.S. Pat. No. 4,500,919. The disclosed color reproduction system comprises means for determining tristimulus appearance signals as common color data from a colored original document, means for effecting aesthetic correction on the tristimulus appearance signals, means for displaying a corrected color image based on the corrected tristimulus appearance signals, and means for selecting color materials for a hard copy to obtain reproduction signals which colorimetrically match the displayed color image. A combination of color materials selected by the color material selecting means is printed, and the printed color materials are measured by a colorimeter. The reproduction signals are then corrected based on the measured data to achieve a match between the printed color image and the displayed color image.

Another conventional color reproduction effort is a color reproduction process based on visual adaptation which is disclosed in International Patent Publication WO 92/17982. It is known that even if the colors of two printed materials colorimetrically match, the colors of the two printed materials are not necessarily visually perceived identically because of the color of the support layer of the printing material and the illuminating conditions. In view of such a fact, the disclosed color reproduction process achieves a more accurate color match by equalizing the white dots of the printed color image to those of the displayed color image in addition to the process of the color reproduction system disclosed in U.S. Pat. No. 4,500,919.

While both of the above conventional attempts are capable of reproducing colors accurately if the only matching condition is the color materials, for example, they are not effective in applications where complex conditions are involved, such as those encountered in producing a printed material.

For producing a printed material, it is necessary to establish not only color materials, but also output conditions including the type of the support layer of a printed material, the number of colors to be printed, a black printer quantity, and a screen ruling, and also printing press conditions including a printing order, a printing pressure, color material quantities, and a printing speed. It has been difficult for the conventional color reproduction arrangements to print color images highly accurately under the above wide range of printing conditions.

SUMMARY OF THE INVENTION

It is therefore an object of the present invention to provide a color reproduction system which is capable of reproducing the colors of a color image highly accurately on a CRT or a printer under various input and output conditions and according to a color reproduction process, allowing the user to confirm the reproduced colors, and flexibly permitting modifications and additions to be made to the input and output conditions and the color reproduction process.

To achieve the above object, there is provided in accordance with the present invention a color reproduction system for processing color image data supplied from an image input unit according to a color reproduction process depending on input conditions of the image input unit and output conditions of an image output unit, and reproducing a color image based on the processed color image data with the image output unit, comprising conversion formula setting means for setting the color reproduction process as at least one image data conversion formula, variable setting means for setting a selectable variable conversion formula and parameters depending on the input and output conditions with respect to variables of the image data conversion formula, and selecting means for selecting the image data conversion formula, the variable conversion formula, and the parameters depending on the input and output conditions, the arrangement being such that the color image data are reproduced using the image data conversion formula, the variable conversion formula, and the parameters which are selected by the selecting means.

According to the present invention, there is also provided a color reproduction system for processing color image data supplied from an image input unit according to a color reproduction process depending on input conditions of the image input unit and output conditions of an image output unit, and reproducing a color image based on the processed color image data with the image output unit, comprising conversion formula setting means for setting the color reproduction process as at least one image data conversion formula, variable setting means for setting a selectable variable conversion formula and parameters depending on the input and output conditions with respect to variables of the image data conversion formula, condition setting means for setting the input and output conditions, and selecting means for selecting the input and output conditions, the image data conversion formula, the variable conversion formula, and the parameters depending on the input and output conditions, the arrangement being such that the color image data are reproduced using the input and output conditions, the image data conversion formula, the variable conversion formula, and the parameters which are selected by the selecting means.

According to the present invention, there is further provided a color reproduction system for processing color image data supplied from an image input unit according to a color reproduction process depending on input conditions of the image input unit and output conditions of an image output unit, and reproducing a color image based on the processed color image data with the image output unit, comprising a common color space converter for converting the color image data into color image data in a common color space based on the color reproduction process, a color range converter for converting the color image data in the common color space into color image data in a color range reproducible by the image output unit which is established depending on the input and output conditions, and a specific color space converter for converting the color image data in the common color space into color image data in a specific color space of the image output unit which is established depending on the input and output conditions, the arrangement being such that a color image is reproduced based on the color image data produced by the specific color space converter.

According to the present invention, there is also provided a color reproduction system for processing color image data supplied from an image input unit according to a color reproduction process depending on input conditions of the image input unit and output conditions of an image output unit, and reproducing a color image based on the processed color image data with the image output unit, comprising a common color space converter for converting the color image data into color image data in a common color space based on the color reproduction process, a color range converter for converting the color image data in the common color space into color image data in a color range reproducible by the image output unit, a specific color space converter for converting the color image data in the common color space into color image data in a specific color space of the image output unit, a conversion process setting unit for setting conversion processes in the common color space converter, the color range converter, and the specific color space converter depending on the input and output conditions, and a process combiner for combining the conversion processes set by the conversion process setting unit, the arrangement being such that the color image data are processed by the conversion processes combined by the conversion process setting unit, and a color image is reproduced based on the processed color image data.

In the color reproduction system, variables of an image data conversion formula representative of a color reproduction process which has been set by the conversion formula setting means are selected from a variable conversion formula set by the variable setting means and parameters according to input and output conditions for processing color image data. Therefore, it is possible to easily process color image data under various input and output conditions for reproducing colors highly accurately, and also to flexibly permit the input and output conditions and the color reproduction process to be modified or added. The color reproduction system thus finds an increased range of applications. Since the input and output conditions can be established as desired depending on the image input and output units used, it is possible to reproduce colors with greater accuracy.

A color image is processed as follows: A color reproduction process is specified based on input and output conditions. Then, color image data are converted from a specific color space of the image input unit into a common color space by the common color space converter, and converted into a color range reproducible by the image output unit by the color range converter. Thereafter, the color image data are converted into color image data in a specific color space of the image output unit by the specific color space converter. In this manner, a color image can be reproduced under desired input and output conditions. The processes in the various converters may be combined for high-speed processing of color image data.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 4 is a diagram showing condition profiles of the output device profile group shown in FIG. 2;

FIG. 9 is a flowchart of a processing sequence of the color reproduction system according to the present invention.

DETAILED DESCRIPTION OF THE PREFERRED EMBODIMENT

Figure 1:
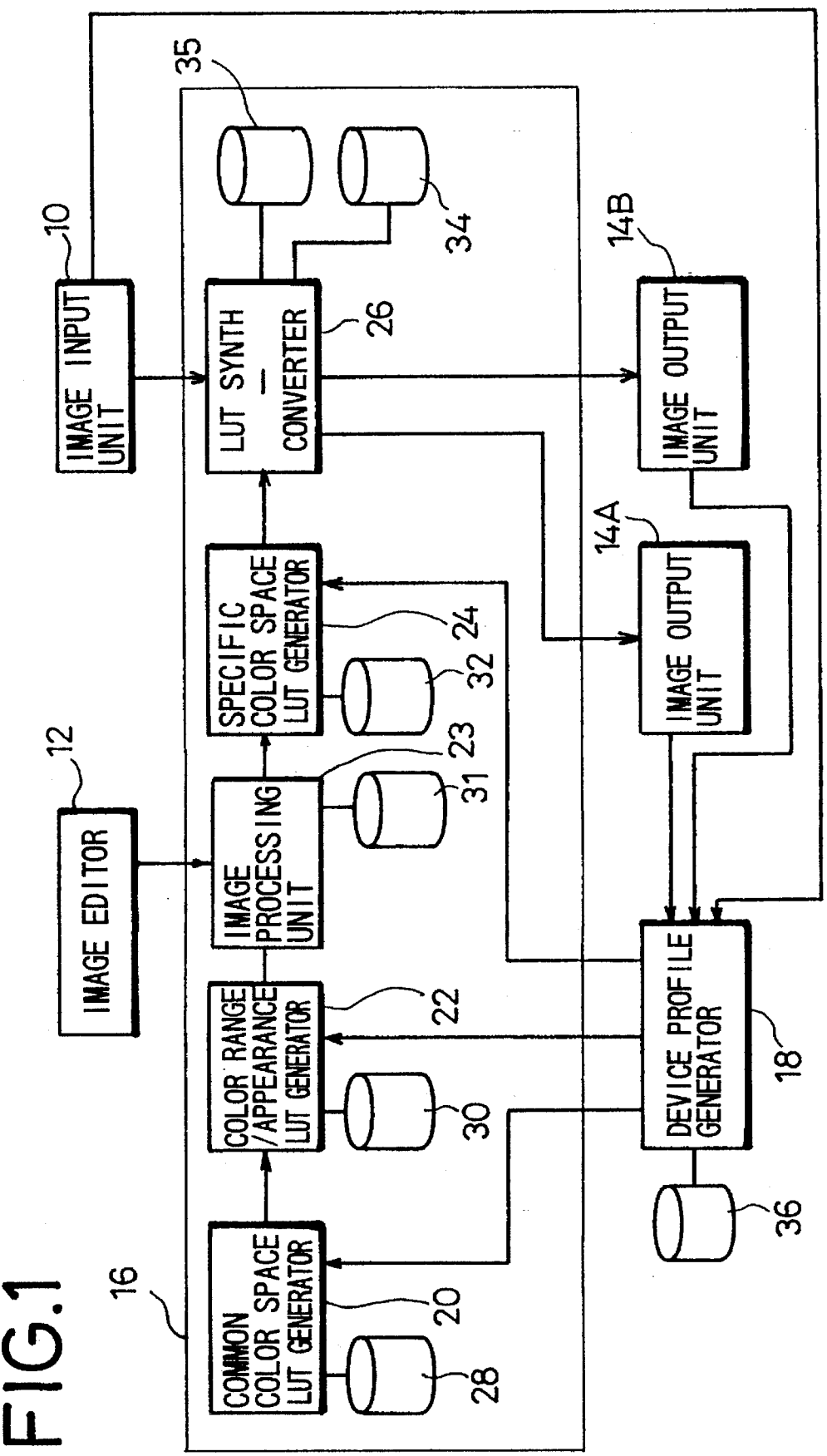
FIG. 1 is a block diagram of a color reproduction system according to the present invention.

As shown in FIG. 1, a color reproduction system according to the present invention generally comprises an image input unit 10 for reading color image data from a color original document or an external device, an image editor 12 for indicating an aesthetic process to be effected on the color image data thus read, an image output unit 14A for displaying or outputting the aesthetically processed color image data on a CRT or the like, an image output device 14B for outputting color separation films (Y, M, C, K plates) of the aesthetically processed color image data as hard copies to produce a printed material, an image processor 16 for effecting the aesthetic process indicated by the image editor 12 on the color image data and converting the color image data into data of specific color spaces corresponding to the image output units 14A, 14B, respectively, and a device profile generator 18 for generating a device profile group of device profiles which represent characteristics of the image input unit 10 and the image output units 14A, 14B, and characteristics of a color reproduction process and color reproduction mediums including color materials, a support layer, phosphors, etc.

The image input unit 10 has three or more sensors having different spectral sensitivities for reading the image densities of pixels of a color original document. For example, the image input unit 10 may comprise a drum-type scanner for reading the image densities of pixels of a color original document mounted on a drum in synchronism with rotation of the drum, or a flatbed scanner for reading the image densities of pixels of a color original document with either a line sensor composed of a single array or a plurality of arrays of photoelectric transducers or a two-dimensional sensor composed of a two-dimensional matrix of photoelectric transducers.

The image output unit 14B color-separates color image data processed by the image processor 16, and outputs the color-separated color image data onto films to produce Y, M, C, K color separation film for generating presensitized plates to produce a printed material. The image output unit 14B may comprise a printing press for generating presensitized plates from the Y, M, C, K color separation film and producing a printed material from the presensitized plates.

The image output unit 14A may comprise a CRT, a printer, or the like for displaying or outputting a color image having the same color representation and image quality as the hard copies generated by the image output unit 14B.

The image processor 16 comprises a common color space LUT generator 20 for generating a common color space conversion table (hereinafter referred to as "LUT") for converting color image data supplied from the image input unit 10 into color image data in a common color space, a color range/appearance LUT generator 22 for generating a color range/appearance conversion table for compressing or converting a color range of the image input unit 10 in the common color space into a color range reproducible by a desired one of the image output units 14A, 14B, and making appearance adjustments depending on the difference between observing conditions, an image processing unit 23 for generating an aesthetic processing table for effecting an aesthetic process on the color image data as indicated by the image editor 12, a specific color space LUT generator 24 for generating a specific color space conversion table for converting the color image data in the common color space into color image data in the specific color space of the desired one of the image output units 14A, 14B, and a LUT synth-converter 26 for generating an image conversion table composed of all or some of the conversion tables generated by the common color space LUT generator 20, the color range/appearance LUT generator 22, the image processing unit 23, and the specific color space LUT generator 24. The LUT synth-converter 26 serves as a process combiner and converts the color image data read by the image input unit 10 based on the composed LUT to output the converted color image data to the image output unit 14A or 14B. The common color space conversion table, the color range/appearance conversion table, the aesthetic processing table, the specific color space conversion table, and the image conversion table are stored respectively in data files 28, 30, 31, 32, 34. To the LUT generator 26, there is connected an image data file 35 for temporarily storing color image data which have been processed by the image conversion table.

The common color space is a color space composed of data not depending on the input and output units and the output medium, such as a CIE-XYZ color system, an $L^*a^*b^*$ color system, an YCC color system which can uniquely be converted mathematically to and from the CIE-XYZ color system or the $L^*a^*b^*$ color system, an YIQ color system, or an RGB color system representing the phosphors of a display monitor such as a CRT or the like. It is therefore possible to carry out desired image processing in the common color space without concern over the input and output units and the output medium. The specific color space is a color space composed of particular data handled by the image input unit 10 and the image output units 14A, 14B.

In the image processor 16, color image data in a specific color space determined by the image input unit 10 are converted into color image data in a common color space using the common color space conversion table, and then the color range of the color image data in the common color space is compressed or converted into the color range reproducible by the image output units 14A, 14B using the color range/appearance conversion table. If necessary, the appearance of the color image data is converted into an appearance corresponding to observing conditions. Then, the color image data are aesthetically processed using the aesthetic processing table. The processed color image data in the common color space are thereafter converted into color image data in specific color spaces determined by the image output units 14A, 14B using the specific color space conversion table.

The device profile generator 18 is a conversion processor which has measuring units for measuring various physical characteristics as desired, establishes color space data conversion formulas, variable conversion formulas, and parameters used in the data processing in the image processor 16 as a device profile group, and establishes conversion processes to be carried out in the common color space LUT generator 20, the color range/appearance LUT generator 22, and the specific color space LUT generator 24. The device profile generator 18 also serves as a selector for selecting the variable conversion formulas and the parameters, and stores the device profile group.

Figure 2:
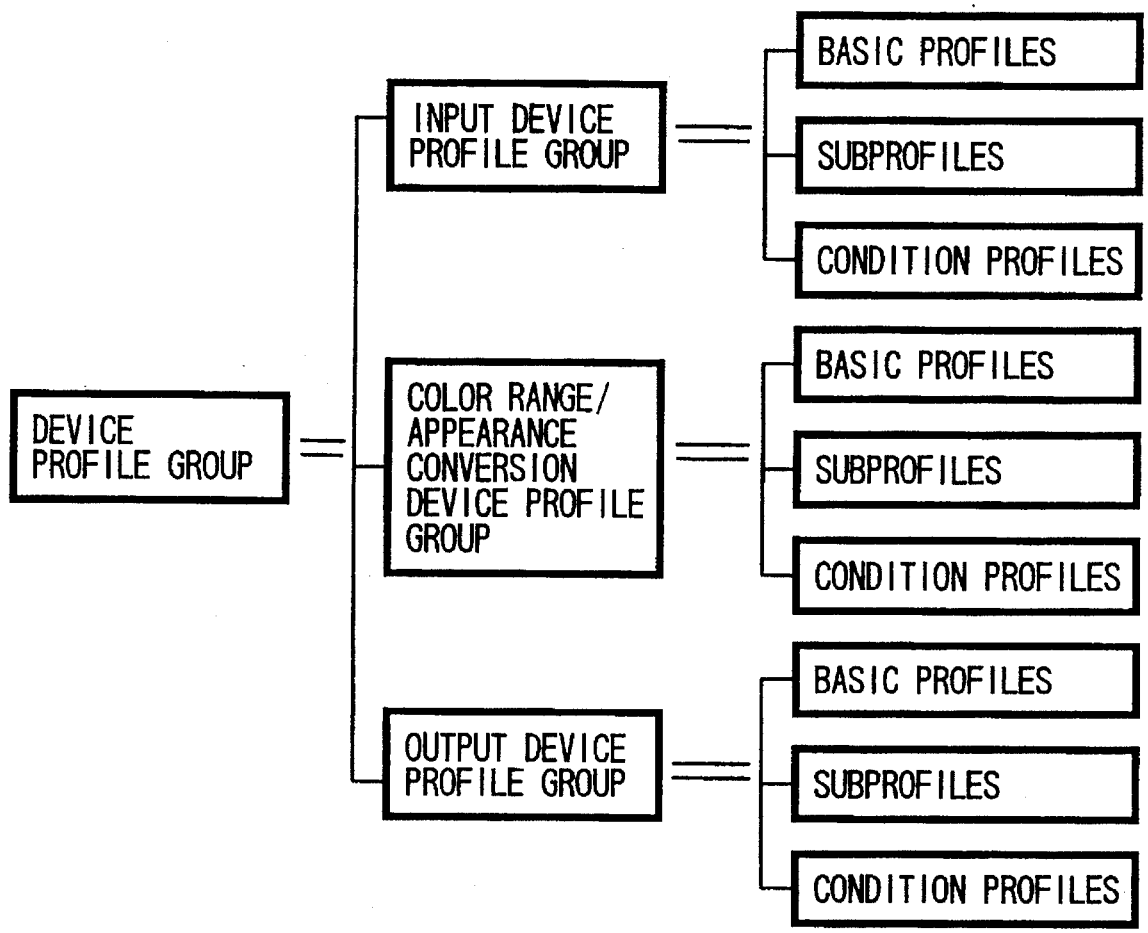
FIG. 2 is a diagram showing a device profile group in the color reproduction system according to the present invention.

The device profile group is a collection of profiles representing, in a common data format, color reproduction processes in the image input unit 10 and the image output devices 14A, 14B, environmental conditions in which they are used, physical factors and characteristics of materials of a color original document and a recording medium, and formulas which couple these data. Basically, as shown in FIG. 2, the device profile group includes an input device profile group for generating a common color space conversion table for converting color image data supplied from the image input unit 10 into color image data in a common color space such as of a CIE-XYZ color system, an $L^*a^*b^*$ color system, or the like, a color range/appearance conversion device profile group for generating a color range/appearance conversion table for converting the color range and appearance of the color image data in the common color space into a desired color range and appearance, and an output device profile group for generating a specific color space conversion table for converting the color image data in the common color space into color image data in specific color spaces in the respective image output units 14A, 14B. Each of the input device profile group, the color range/appearance conversion device profile group, and the output device profile group includes basic profiles, subprofiles, and condition profiles.

Figure 3:
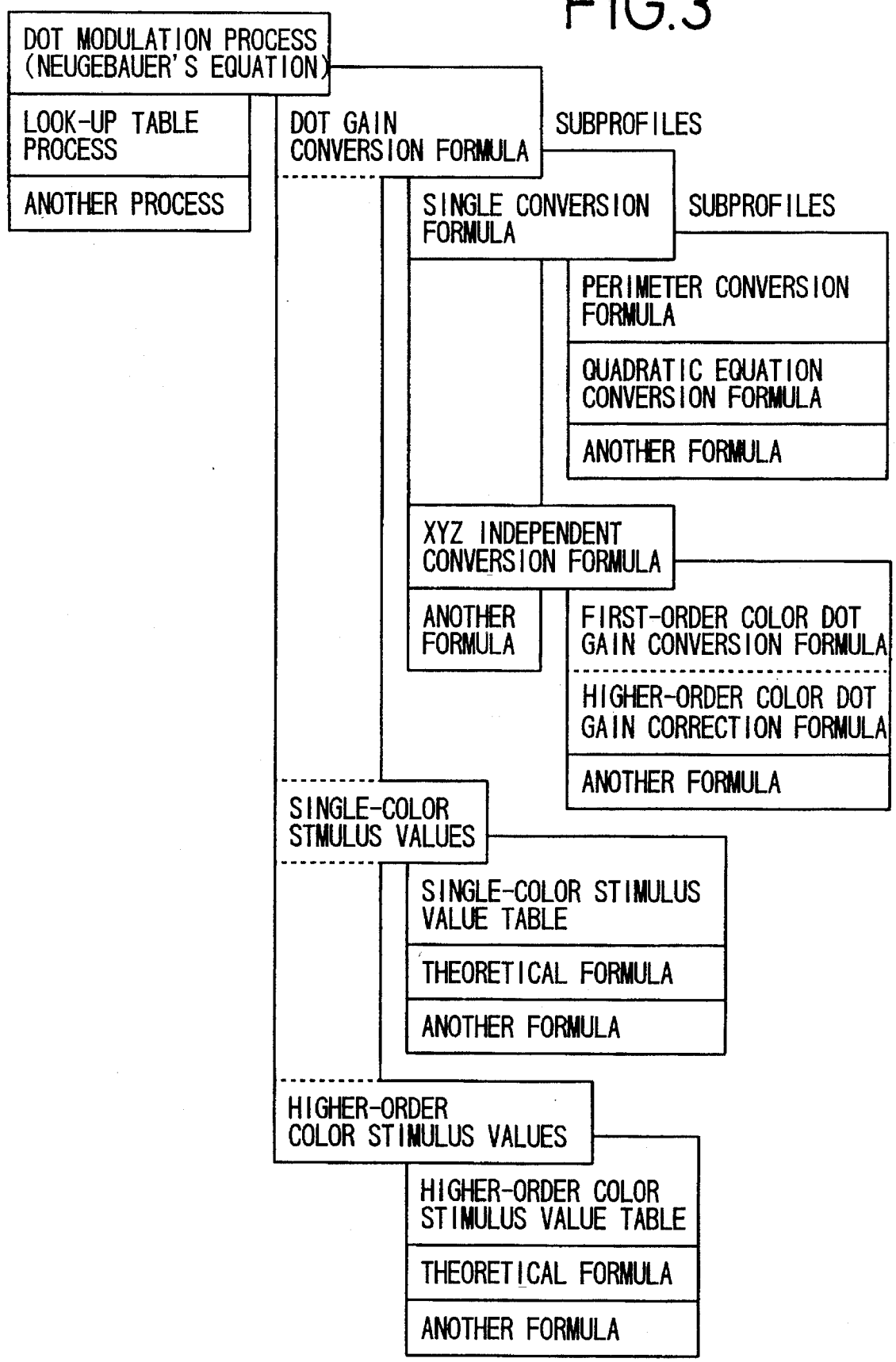
FIG. 3 is a diagram showing a hierarchical structure of basic profiles and subprofiles of an output device profile group shown in FIG. 2.

FIG. 3 shows the basic profiles and subprofiles of the output device profile group which is defined in relation to the color separation processes in the image output devices 14A, 14B. The basic profiles represent a plurality of color representation processes established in the data file 36 that serves as conversion formula setting means. The subprofiles represent conversion formulas for variables of the color representation processes and parameters, which are established in the data file 36 that serves as variable setting means.

The basic profiles represent (1) a dot modulation process using the Neugebauer's equation, (2) a conversion process using a look-up table, and (3) another process, respectively, which can be selected one at a time. One of these basic profiles is selected depending on the color separation processes in the image output devices 14A, 14B, and established as a color space data conversion formula for conversion between the common color space and the specific color spaces of the image output devices 14A, 14B.

The Neugebauer's equation is a color-predicting basic function which defines the relationship between the XYZ and YMCK color systems in the CIE common color space, and is defined according to the equation (1) below.

$$\begin{aligned}
X = \quad & X_c \cdot c_x \cdot (1-m_x) \cdot (1-y_x) \cdot (1-k_x) \\
+ & X_m \cdot m_x \cdot (1-c_x) \cdot (1-y_x) \cdot (1-k_x) \\
+ & X_y \cdot y_x \cdot (1-c_x) \cdot (1-m_x) \cdot (1-k_x) \\
+ & X_k \cdot k_x \cdot (1-c_x) \cdot (1-m_x) \cdot (1-y_x) \\
+ & X_w \cdot (1-k_x) \cdot (1-c_x) \cdot (1-m_x) \cdot (1-y_x) + \\
+ & X_{cm} \cdot c_{xm} \cdot m_{xc} \cdot (1-y_x) \cdot (1-k_x) \\
+ & X_{cy} \cdot c_{xy} \cdot y_{xc} \cdot (1-m_x) \cdot (1-k_x) \\
+ & X_{ck} \cdot c_{xk} \cdot k_{xc} \cdot (1-m_x) \cdot (1-y_x) \\
+ & X_{my} \cdot m_{xy} \cdot y_{xm} \cdot (1-c_x) \cdot (1-k_x) \\
+ & X_{mk} \cdot m_{xk} \cdot k_{xm} \cdot (1-c_x) \cdot (1-y_x) \\
+ & X_{yk} \cdot y_{xk} \cdot k_{xy} \cdot (1-c_x) \cdot (1-m_x) \\
+ & X_{cmy} \cdot c_{xmy} \cdot m_{xcy} \cdot y_{xcm} \cdot (1-k_x) \\
+ & X_{cmk} \cdot c_{xmk} \cdot m_{xck} \cdot k_{xcm} \cdot (1-y_x) \\
+ & X_{myk} \cdot m_{xyk} \cdot y_{xmk} \cdot k_{xmy} \cdot (1-c_x) \\
+ & X_{cyk} \cdot c_{xyk} \cdot y_{xck} \cdot k_{xcy} \cdot (1-m_x) \\
+ & X_{cmyk} \cdot c_{xmyk} \cdot m_{xcyk} \cdot y_{xcmk} \cdot k_{xcmy} \\
Y = \quad & Y_c \cdot c_y \cdot (1-m_Y) \cdot (12-y_Y) \cdot (1-k_Y) \\
+ & \ldots \\
Z = \quad & Z_c \cdot c_z \cdot (1-m_z) \cdot (1-y_z) \cdot (1-k_z) \\
+ & \ldots
\end{aligned} \quad (1)$$

{first-order color term, second-order color term, third-order color term, fourth-order color term} where X, Y, Z represent tristimulus values in the XYZ color system, $X_c$, $X_m$, $X_y$, $X_k$, etc. represent XYZ stimulus values (single-color stimulus values) with respect to single-color inks of Y, M, C, and K, $X_w$, etc. represent tristimulus values of the support layer of the printed material, $X_{cm}$, $X_{cmy}$, $X_{cmyk}$, etc. represent XYZ stimulus values (higher-order color stimulus values) of an area where inks are superimposed, e.g., $X_{cm}$ represent XYZ stimulus values of an area where inks of C and M are superimposed, $c_x$, $m_x$, $y_x$, $k_x$, etc. represent dot % values of inks of C, M, Y, K at the time they are observed with color light corresponding to color matching functions $x(\lambda)$, and $c_{Xm}$, $c_{Xmy}$, $c_{Xmyk}$, etc. represent dot % values of an ink of C at the time it is observed with color light corresponding to the color matching functions $x(\lambda)$, e.g., $c_{Xmy}$ represents a dot % value for making a correction with respect to the presence of the inks of M and Y (higher-order color dot gain correction). Since the XYZ color system has a one-to-one correspondence to the $L^*a^*b^*$ color system, the Neugebauer's equation can be defined as an equation indicative of the relationship between the $L^*a^*b^*$ color system and the YMCK color system.

Depending on the selected basic profile, there is established a subprofile in which set values can be selected according to predetermined relationship equations or output conditions. For example, if the dot modulation process using the Neugebauer's equation is selected as the basic profile, then its variables are classified into (11) a dot gain conversion formula ($c_X$, $m_X$, $c_{Xm}$, $c_{Xmy}$, etc.), (12) single-color stimulus values ($X_c$, $X_m$, $X_y$, $X_k$, etc.), and (13) higher-order color stimulus values ($X_{cm}$, $X_{cmy}$, $X_{cmyk}$, etc.), and subprofiles are established for each of these sets of values. For the dot gain conversion formula, it is possible to select a desired subprofile from (21) a single conversion formula, (22) an XYZ independent conversion formula, and (23) another formula. For the single-color stimulus values, it is possible to select a desired subprofile from (31) a single-color stimulus value table, (32) a theoretical formula, and (33) another formula. For the higher-order color stimulus values, it is possible to select a desired subprofile from (41) a higher-order color stimulus value table, (42) a theoretical formula, and (43) another formula. The single conversion formula represents a process for representing and processing $c_X$, $c_Y$, $c_Z$, etc. with one value $c_n$ independent of X, Y, Z in the equation (1) above, and the XYZ independent conversion formula represents a process for establishing and processing $c_X$, $c_Y$, $c_Z$, etc. independently for each of X, Y, Z.

Depending on each of the above subprofiles, there is established a subprofile in which another relationship equation can be established. For example, with respect to the subprofile of the single conversion formula, a desired subprofile can be selected from (51) a perimeter conversion formula, (52) a quadratic equation conversion formula, and (53) another formula. With respect to the subprofile of the XYZ independent conversion formula, a desired subprofile can be selected from (61) a first-order color dot gain conversion formula, (62) a higher-order color dot gain conversion formula, and (63) another formula.

The perimeter conversion formula which can be selected with respect to the subprofile of the single conversion formula is a formula for calculating dot % values $c_X$, $c_Y$, $c_Z$, etc. (=$c_n$, etc.) in the case where the dot gain is considered to be proportional to the perimeter of formed dots. The perimeter conversion formula is defined by:

$$c_n = c + \alpha_p \cdot \alpha_m \cdot L \cdot \sqrt{c} \ /1500 \quad (0 \leq c < 50) \quad (2)$$
$$= c + \alpha_p \cdot \alpha_m \cdot L \cdot \sqrt{100-c} \ /1500 \quad (50 \leq c < 100)$$

where $\alpha_p$, $\alpha_m$ are gain coefficients, and L the screen ruling. The gain coefficient $\alpha_p$ is a parameter depending on the paper on which the color image is to be printed, and the gain coefficient $\alpha_m$ is a parameter depending on the printing press and the ink.

The quadratic equation conversion formula is a quadratic equation for calculating the dot % values $c_n$ on the printed material in view of the exposure, development, printing, and optical dispersion effect of the presensitized plates, and defined as follows:

$$c_n = c + g - g/250 \cdot (c-50)^2 \quad (3), \text{ and}$$

$$g = g_1 + g_2 + g_3 + g_4 + g_5 \quad (4)$$

where $g_1$ is a gain coefficient which is a parameter depending on the printing press, $g_2$ is a gain coefficient which is a parameter depending on the ink, $g_3$ is a gain coefficient which is a parameter depending on the paper of the support layer of the printed material, $g_4$ is a gain coefficient which is a parameter depending on the screen ruling, and $g_5$ is a gain coefficient which is a parameter depending on the dot shape. The first-order dot gain conversion formula which can be selected with respect to the XYZ independent conversion formula sets the gain coefficient $\alpha_p$ in the equation (2) to $\alpha_{pX}$, $\alpha_{pY}$, $\alpha_{pZ}$ independently for the respective stimulus values of X Y, Z and also sets the dot % value $c_X$, for example, as:

$$c_X = c + \alpha_{pX} \cdot \alpha_m \cdot L \cdot \sqrt{c} \ /1500 \quad (0 \leq c < 50) \quad (5)$$
$$= c + \alpha_{pX} \cdot \alpha_m \cdot L \cdot \sqrt{100-c} \ /1500 \quad (50 \leq c < 100)$$

with respect to the perimeter conversion formula, and sets the dot % value $c_X$ as:

$$c = c + g - g/250 \cdot (c_X - 50)^2 \quad (6)$$

based on the equation (3) with respect to the quadratic equation conversion formula.

The higher-order color dot gain conversion formula sets the dot % value $c_{xy}$, for example, as:

$$c_{xy} = c_X - a_{cxy} \cdot y_x^2 + b_{cxy} \cdot y_x \quad (7)$$

where $a_{cxy}$, $b_{cxy}$ are higher-order color dot gain correction parameters, with respect to the dot % values of the second- and higher-order color term in the equation (1).

FIG. 4 shows printing output condition profiles of the output device profile group shown in FIG. 2. The printing output condition profiles represent input and output conditions of the image input unit 10 and the image output units 14A, 14B, which are stored in the data file 36 that serves as condition selecting means. The printing output condition profiles are used for generating a printed material, and composed of a support layer profile for defining parameters ($\alpha_p$, $\alpha_{pX}$, $\alpha_{pY}$, $\alpha_{pZ}$, $g_3$, $a_{cxy}$, $b_{cxy}$, etc.) relative to the paper of the support layer of the printed material, a screen ruling/dot shape profile for defining parameters (L, $g_4$, etc.) relatively to the screen ruling and the dot shape, an ink profile for defining parameters ($g_2$, $\alpha_m$, a single-color stimulus value table, a higher-order color stimulus value table, theoretical formula parameters, etc.) relatively to the characteristics of inks used in the printing, a black printer quantity profile for defining parameters (p, k, etc.) relative to a black printer quantity (described later on), a look-up table to be referred to when the look-up table formula is selected from the basic profiles shown in FIG. 3, a standard profile for defining average parameters with respect to parameters not defined in the above profiles, and other profiles (including those relative to the printing press).

Figure 5:
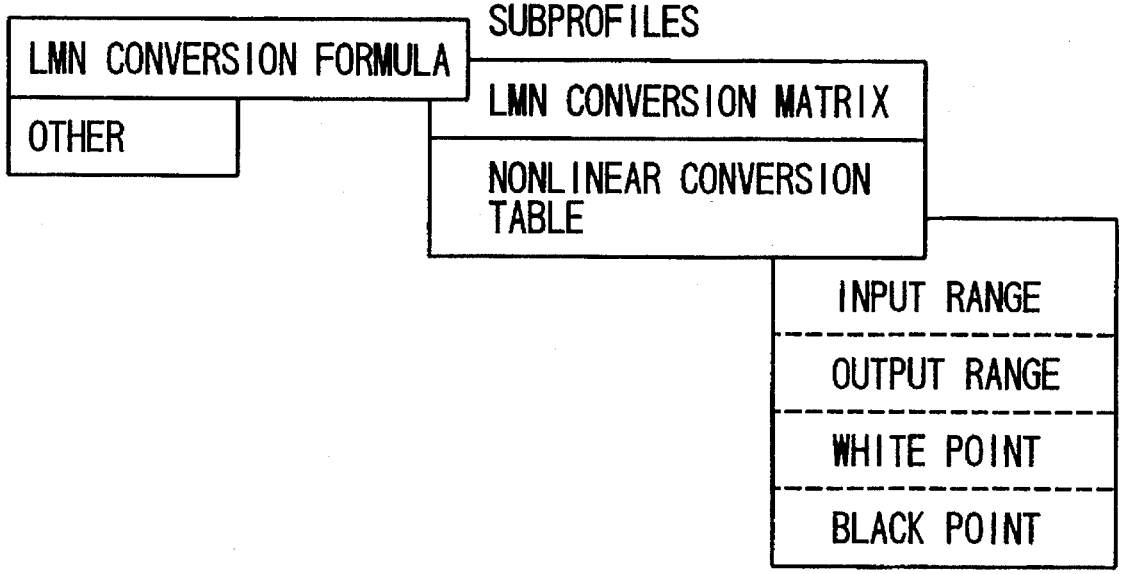
FIG. 5 is a diagram showing a hierarchical structure of basic profiles and subprofiles of a color range/appearance conversion device profile group shown in FIG. 2.

Similarly, as shown in FIG. 5, the color range/appearance conversion device profile group is composed of basic profiles representing (71) an LMN conversion process and (72) another process for postscript tristimulus values, one of which can be selected at a time, and subprofiles representing (81) an LMN conversion matrix, (82) a nonlinear conversion table, and (83) another table, one of which can be selected at a time with respect to the LMN conversion process. Variables relative to (91) an input range, (92) an output range, (93) a white point, and (94) a black point are established with respect to the nonlinear conversion table.

Figure 6:
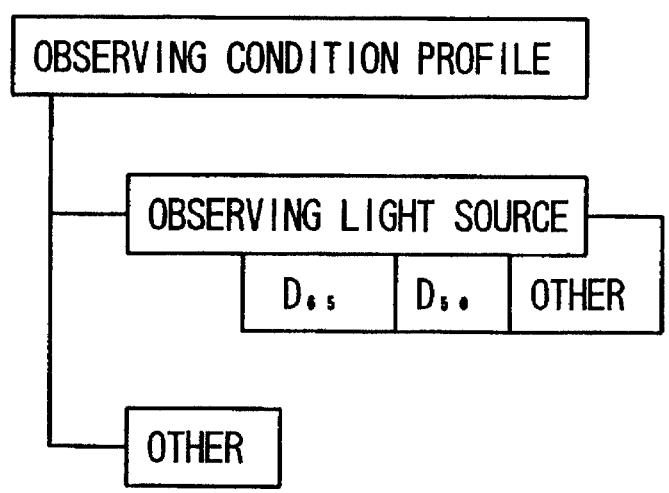
FIG. 6 is a diagram of condition profiles of the color range/appearance conversion device profile group shown in FIG. 2.

As shown in FIG. 6, the color range/appearance conversion device profile group is also composed of subprofiles representing parameters relative to an observing light source, and other parameters.

The input device profile group is established in a hierarchical structure composed of the type of a color original document read by the image input unit 90, the sensitivity characteristics of a sensor, a conversion formula for conversion into the common color space, as with the output device profile group.

Figure 7:
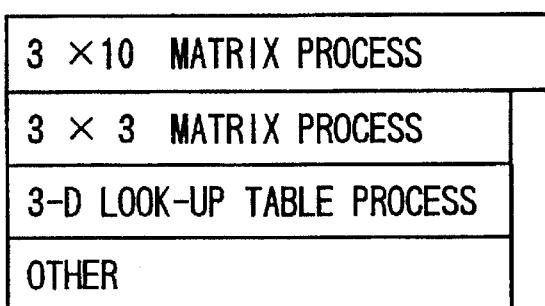
FIG. 7 is a diagram showing a hierarchical structure of basic profiles and subprofiles of an input device profile group shown in FIG. 2.
Figure 7:
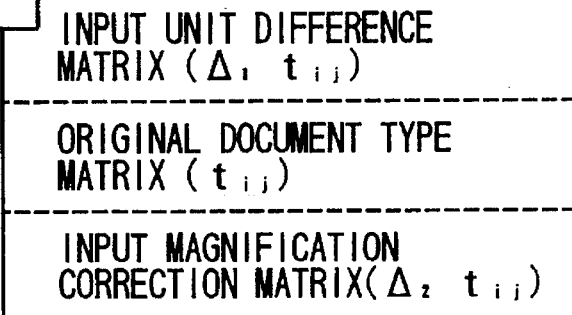

For example, as shown in FIG. 7, the input device profile group is composed of basic profiles of color space data conversion formulas representing (101) a 3×10 matrix process, (102) a 3×3 matrix process, (103) a three-dimensional look-up table process, and (104) another process, one of which can be selected at a time. The 3×10 matrix process is a process for converting color image data B, G, R into X, Y, Z stimulus values according to the following equations (8) and (9):

$$\begin{pmatrix} X \\ Y \\ Z \end{pmatrix} = [T_{ij}] \begin{pmatrix} B \\ G \\ R \\ BG \\ GR \\ RB \\ B^2 \\ G^2 \\ R^2 \\ 1 \end{pmatrix}, \quad (8)$$

$$T_{ij} = t_{ij}(1 + \Delta_1 t_{ij} + \Delta_2 t_{ij}). \quad (9)$$

The matrix $[T_{ij}]$ which is defined by the equation (9) is defined by each of the correction matrixes of the subprofiles.

Figure 8:
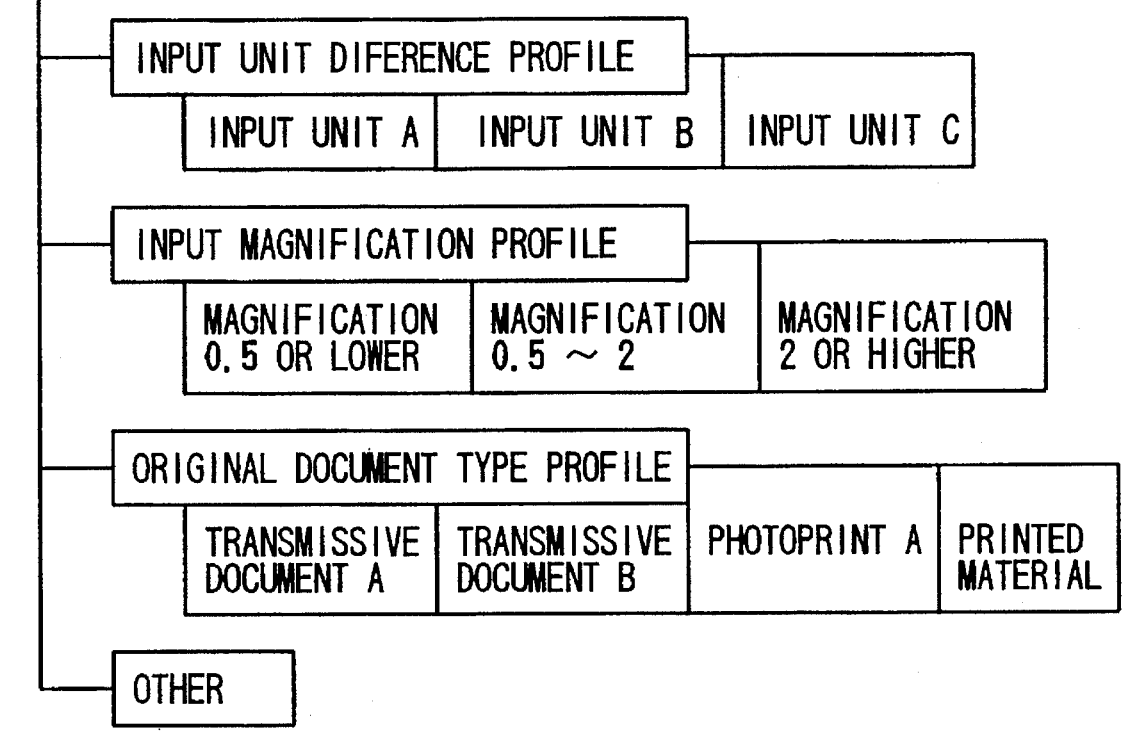
FIG. 8 is a diagram of condition profiles of the input device profile group shown in FIG. 2.

The input device profile group is also composed of input condition profiles as shown in FIG. 8. The input condition profiles include an input unit difference profile which establishes parameters relative to the difference between the image input unit 10 and a standard unit as an input unit difference matrix $[\Delta_1 t_{ij}]$, an input magnification profile which establishes parameters relative to a magnification at the time an image is inputted as a magnification correction matrix $[\Delta_2 t_{ij}]$, and an original document type profile which establishes a three-dimensional look-up table or the like, and another profile.

The common color space conversion table can be generated from data which are obtained by reading a calibration chart corresponding to measured values in the common color space with the image input unit 10 and data obtained by reading the calibration chart directly with a densitometer or the like.

Data processing in the color reproduction system according to the present invention will be described below with reference to FIG. 9.

First, the operator determines system configurations including the image input unit 10, the image output units 14A, 14B, the type of an original document on which a color image is recorded, an output medium, the type of inks used for recording a color image, and an output format, etc. in a step S1.

After the image input unit 10, the image output units 14A, 14B, and other types are determined, the device profiles shown in FIGS. 3 through 8 are established using the device profile generator 18 in a step S2. These device profiles may be determined in advance depending on given devices before the system configurations of the color reproduction system are determined.

After the system configurations and the device profiles are determined, a common color space conversion table for converting color image data supplied from the image input unit 10 into data in a common color space is generated in the common color space LUT generator 20 in a step S3. At this time, the selection of basic profiles and subprofiles depends on whether the parameters relative to these profiles are prepared in the condition profiles and whether these profiles are profiles which can cope with a requested processing speed. Therefore, not all the profiles are freely selected by the operator, but some of them are limited by prepared profiles. If no desired profiles have been established, then default values are selected.

A desired process is selected from the basic profiles shown in FIG. 7, and a subprofile corresponding to the selected process is selected. If the 3×10 matrix process is selected from the basic profiles shown in FIG. 7, then a matrix $[T_{ij}]$ (see the equation (9)) which represent parameters of the selected process is selected from the input condition profiles shown in FIG. 8 through the subprofile. For example, the input unit difference matrix $[\Delta_1 t_{ij}]$ is established from the input unit difference profile depending on the type of the image input unit 10, the magnification correction matrix $[\Delta_2 t_{ij}]$ is established from the input magnification profile depending on the magnification of the inputted image, and the original document correction matrix $[t_{ij}]$ is established from the original document type profile depending on the type of the inputted original document. As a result, a common color space conversion table composed of the conversion formula according to the equation (8) is determined. The common color space conversion table is stored in the data file 28. If no data of the matrix $[t_{ij}]$ is established in the input condition profiles, then a basic profile capable of determining a conversion formula is selected based on other data.

A common color space conversion table based on the characteristics of the color original document may be established using the above calibration chart or the like without the input device profile group. Specifically, the image input unit 10 reads a calibration chart whose measured values in a desired common color space are known, the calibration chart having the same characteristics as the color original document, and, based on the obtained color image data of the calibration chart, the common color space LUT generator 20 generates a common color space conversion table for converting color image data into data in a common color space in the step S3.

The color range/appearance LUT generator 22 of the image processor 16 successively selects a desired color reproduction process from the color range/appearance conversion device profile group shown in FIGS. 5 and 6, and equalizes the color range of the image input unit 10 in the common color space with the color range reproducible by the image output unit 14A or 14B in the common color space based on the selected color reproduction process, and generates a color range/appearance conversion table for equalizing appearances corresponding to the visual adaptation in a step S4. In the generation of the color range/appearance conversion table, parameters corresponding to the observing light source are given from the observing condition profiles shown in FIG. 6, and parameters of the input and output ranges are given from the input condition profiles shown in FIG. 8 and the printing output profiles shown in FIG. 4.

The color range/appearance conversion table is generated according to the selected process as follows: For example, the LMN conversion formula suitable for the observing conditions with respect to the color original document and the type of the color image data is selected from the basic profiles, and the nonlinear conversion table is selected from the subprofiles for conversion from the $L^*a^*b^*$ color system into the LMN color system. The nonlinear conversion table is corrected with respect to the color range (the input range, the output range, etc.) and differences between observing conditions/color temperatures, and a conversion from the LMN color system into an $L^*M^*N^*$ color system is carried out. Finally, an inverse conversion from the $L^*M^*N^*$ color system into an Lab color system is effected. A conversion table for conversion from the $L^*a^*b^*$ color system into the Lab color system is stored as a color range/appearance conversion table in the data file 30.

The specific color space LUT generator 24 of the image processor 16 successively selects a desired color reproduction process from the input device profile group shown in FIGS. 3 and 4, and generates a specific color space conversion table based on the selected color reproduction process in a step S5.

Generation of a specific color space conversion table corresponding to the image output unit 14B for producing hard copies will be described in detail below. To obtain a desired color image from the image output unit 14B, a color reproduction process of the image output unit 14B is specified, and a basic formula depending on a desired accuracy and processing speed is selected.

If the image output unit 14B is of the dot modulation output type, then the Neugebauer's equation which defines the relationship between the XYZ color system and the YMCK color system in the CIE common color space is selected as a color-predicting basic function from the basic profiles shown in FIG. 3. The Neugebauer's equation according to the equation (1) has variables classified into the dot gain conversion formula ($c_x$, $m_x$, $c_{Xm}$, $c_{Xmy}$, etc.), the single-color stimulus values ($X_c$, $X_m$, $X_y$, $X_k$, etc.), and the higher-order color stimulus values ($X_{cm}$, $X_{cmy}$, $X_{cmyk}$, etc.), and subprofiles are established for each of these sets of values.

If the single conversion formula and the perimeter conversion formula are selected from the subprofiles with respect to the dot gain conversion formula, then the $c_x$, $m_x$, $c_{Xm}$, $c_{Xmy}$, etc. are replaced by the corrective formula according to the equation (2), and the parameters $\alpha_p$, $\alpha_m$, L thereof are given by the support layer profile and the ink profile of the printing output condition profiles shown in FIG. 4. The parameter $\alpha_p$ is a variable depending on the paper on which a color image is to be printed. Typically, the parameter $\alpha_p$ is set to 13 for art paper, 16 for coat paper, and 20 for wood-free paper. The parameter $\alpha_m$ is a variable depending on the inks, and is set to 1 for average offset printing, and 1 or less when inks or printing conditions with a low dot gain.

If the quadratic equation conversion formula is selected from the subprofiles with respect to the single conversion formula, then the $c_X$, $m_X$, $c_{Xm}$, $c_{Xmy}$, etc. are replaced by the corrective formulas according to the equations (3) and (4), and the gains coefficients $g_1$~$g_5$ as their parameters are given by the support layer profile, the screen ruling/dot shape profile, and the ink profile of the printing output condition profiles shown in FIG. 4.

The single conversion formula is employed when a common dot % value is used with respect to the X, Y, Z stimulus values. If different dot % values are used to correspond to the respective X, Y, Z stimulus values for increased accuracy, then the XYZ independent conversion formula is selected from the subprofiles with respect to the dot gain conversion formula. At this time, the $c_X$, $m_X$, etc. are replaced by the corrective formulas according to the equation (5) or (6), and the $c_{Xm}$, $c_{Xmy}$, etc. are replaced by the corrective formula according to the equation (7). The parameters $\alpha_{pX}$, $\alpha_{pY}$, $\alpha_{pZ}$, $\alpha_m$, L, $a_{cXy}$, $b_{xXy}$, the gain coefficients $g_1$~$G_5$ are given by the support layer profile, the screen ruling/dot shape profile, and the ink profile of the printing output condition profiles shown in FIG. 4.

If the single-color stimulus value table and the higher-order color stimulus value table are selected with respect to the single-color stimulus values and the higher-order color stimulus values, then tables relative to a given ink set and a given support layer are selected from the ink profile. If data of an ink set used in the printing output condition profile are not registered, then default values are selected from the standard profile.

As described above, the parameters of the Neugebauer's equation according to the equation (1) are determined, and tristimulus values X, Y, Z are determined from the outputted dot % values using this conversion formula.

It is actually necessary here to determine what dot % values are to be used to generate color separation films in order to produce a printed material corresponding to the tristimulus values X, Y, Z. In this case, the following three problems are posed:

(1) The conversion from the XYZ or $L^*a^*b^*$ color system into the YMCK color system is a conversion from three variables into four variables, and no unique solution can be found.

(2) The conversion between these variables using a formula including higher-order terms or a table is difficult to solve analytically.

(3) Since the color ranges are different, the YMCK values may exceed a range from 0 to 100%.

These problems are solved using the parameters of the printing conditions to determine a specific color space conversion table.

First, a limitation is given such that the value k of the black printer quantity is determined as a function of the minimum value of y, m, c. For example, the value k is defined as follows:

$$k = k | min(y, m, c) - p | (min(y, m, c) > p) \quad (10).$$

While the above equation represents a linear conversion function which increases from a point p at a gradient k, it is possible to establish the relationship between the minimum value min (y, m, c) of y, m, c and the value k in a table. The value k is determined depending on the printing conditions. To increase the ratio of the value k in the printed material, the point p may be reduced, and the gradient k may be increased. The parameters p, k are established by the black printer quantity of the printing output condition profiles shown in FIG. 4.

The above conversion can now be concluded as the problem of converting the three variables X, Y, Z or $L^*$, $a^*$, $b^*$ into the three variables y, m, c, and this problem can be solved by the Jacobian process. The variables X, Y, Z or $L^*$, $a^*$, $b^*$ are a nonlinear function of the variables y, m, c. In a minute region, however, the variables X, Y, Z or $L^*$, $a^*$, $b^*$ are assumed as linear, and repeatedly calculated. For examples, certain values of y, m, c are inputted to a hypothetical device, and differential data $\Delta L^*$, $\Delta a^*$, $\Delta b^*$ between outputted values of $L^*$, $a^*$, $b^*$ and desired values are calculated. If the differential data $\Delta L^*$, $\Delta a^*$, $\Delta b^*$ do not fall within a range of certain accuracy, then the product of the differential data $\Delta L^*$, $\Delta a^*$, $\Delta b^*$ and a Jacobian inverse matrix is calculated as corrective quantities $\Delta y$, $\Delta m$, $\Delta c$ of the values of y, m, c, and values $y+\Delta y$, $m+\Delta m$, $c+\Delta c$ are inputted again to the hypothetical device to determine values of $L^*$, $a^*$, $b^*$.

In this manner, it is possible to generate a specific color space conversion table for determining y, m, c, k from X, Y, Z or $L^*$, $a^*$, $b^*$. The generated specific color space conversion table is stored in the data file 32 shown in FIG. 1.

The operator operates the image processing unit 23 to generate an aesthetic processing table using the image editor 12, and stores the generated aesthetic processing table in the data file 31.

The common color space conversion table, the color range/appearance conversion table, the specific color space conversion table, and the aesthetic processing table are combined in the LUT synth-converter 26, or stored as individual image conversion tables in the data file 34 in a step S6.

Then, the operator operates the image input unit 10 to read color image data of a color original document corresponding to the conditions of the generated image conversion tables in a step S7. Then, the image processor 16 converts the color image data supplied from the image input unit 10 according to conversion tables established for the image output devices 14A, 14B. Specifically, the image data file 35 for temporarily storing color image data is connected to the LUT synth-converter 26. The LUT synth-converter 26 processes the color image data based on the common color space conversion table, the color range/appearance conversion table, and the aesthetic processing table, and temporarily stores the processed color image data in the image data file 35. The LUT synth-converter 26 then converts the processed color image data with the specific color space conversion tables established for the image output devices 14A, 14B in a step S8, and supplies the converted color image data to the image output units 14A, 14B.

The image output unit 14A displays a color image on the CRT. The image output unit 14B outputs color separation films of Y, M, C, K, and a printed material is finally generated from the color separation films of Y, M, C, K in a step S9. If the image displayed on the CRT of the image output unit 14A needs to be aesthetically corrected in a step S10, then the aesthetic processing table stored in the data file 31 is corrected by the image editor 12, the image conversion tables are corrected according to the corrected aesthetic processing table, and the color image data are processed again according to the corrected image conversion tables.

The color image displayed on the CRT has been processed in view of various output conditions of the color image outputted as the printed material, e.g., the type of the printing press, the characteristics of the inks used to print the color image, the type of the printing paper, and the observing conditions. Therefore, the displayed color image can be observed in reproduced colors of high color matching. Therefore, the operator can evaluate the color image displayed on the CRT before a final printed material is produced.

Inasmuch as conversion formulas, corrective formulas, and parameters can be added or modified as desired with respect to the basic profiles, the subprofiles, and the condition profiles, the color reproduction system according to the present invention finds a range of applications which can easily be expended, and can reproduce color images with increased accuracy.

Although a certain preferred embodiment of the present invention has been shown and described in detail, it should be understood that various changes and modifications may be made therein without departing from the scope of the appended claims.

What is claimed is:

1. A color reproduction system for processing color image data supplied from an image input unit according to a color reproduction process depending on input conditions of the image input unit and output conditions of an image output unit, and reproducing a color image based on the processed color image data with the image output unit, comprising:

conversion formula setting means for setting the color reproduction process as at least one image data conversion formula;

variable setting means for setting a selectable variable conversion formula and parameters depending on the input and output conditions with respect to variables of said image data conversion formula; and selecting means for selecting said image data conversion formula, said variable conversion formula, and said parameters depending on the input and output conditions;

the arrangement being such that the color image data are reproduced using said image data conversion formula, said variable conversion formula, and said parameters which are selected by said selecting means.

2. A color reproduction system according to claim 1, further comprising condition setting means for setting the input and output conditions, wherein the arrangement being such that the color image data are reproduced using said input and output conditions, said image data conversion formula, said variable conversion formula, and said parameters which are selected by said selecting means.

3. A color reproduction system according to claim 1 or 2, wherein said conversion formula setting means comprises means for setting a Neugebauer's equation as said image data conversion formula as a basic profile.

4. A color reproduction system according to claim 1 or 2, wherein said variable conversion formula comprises at least a dot gain conversion formula set as a subprofile depending on a recording medium to record the color image thereon.

5. A color reproduction system according to claim 1 or 2, wherein said variable setting means includes second variable setting means for setting another selectable variable conversion formula or parameters with respect to variables of said variable conversion formula.

6. A color reproduction system according to claim 2, wherein said condition setting means comprises means for setting a difference between the image input unit and a reference image input unit as a condition profile.

7. A color reproduction system according to claim 2, wherein said condition setting means comprises means for setting an input magnification of the image input unit as a condition profile.

8. A color reproduction system according to claim 2, wherein said condition setting means comprises means for setting a type of an original document bearing a color image inputted to the image input unit, as a condition profile.

9. A color reproduction system according to claim 2, wherein said condition setting means comprises means for setting an observing light source for observing a reproduced color image therewith, as a condition profile.

10. A color reproduction system according to claim 2, wherein said condition setting means comprises means for setting a type of a recording medium for recording a reproduced color image thereon, as a condition profile.

11. A color reproduction system according to claim 2, wherein said condition setting means comprises means for setting a screen ruling and a dot shape of the image output unit as a condition profile.

12. A color reproduction system according to claim 2, wherein said condition setting means comprises means for setting inks used to record a reproduced color image therewith, as a condition profile.

13. A color reproduction system for processing color image data supplied from an image input unit according to a color reproduction process depending on input conditions of the image input unit and output conditions of an image output unit, and reproducing a color image based on the processed color image data with the image output unit, comprising:

a common color space converter for converting the color image data into color image data in a common color space based on the color reproduction process;

a color range converter for converting the color image data in the common color space into color image data in a reproducible color range of the image output unit which is established depending on the input and output conditions; and a specific color space converter for converting the color image data in a reproducible color range into color image data in a specific color space of the image output unit which is established depending on the input and output conditions;

the arrangement being such that a color image is reproduced based on the color image data produced by said specific color space converter.

14. A color reproduction system according to claim 13, further comprising: a conversion process setting unit for setting conversion processes in said common color space converter, said color range converter, and said specific color space converter depending on the input and output conditions; and a process combiner for combining the conversion processes set by said conversion process setting unit, wherein the arrangement being such that the color image data are processed by the conversion processes combined by said conversion process setting unit, and a color image is reproduced based on the processed color image data.

* * * * *